United States Patent [19]
Yu

[11] Patent Number: 5,726,629
[45] Date of Patent: Mar. 10, 1998

[54] LIGHTING FIXTURE WITH MOTION DETECTOR AND ANNOUNCEMENT DEVICE

[76] Inventor: Raymond Y. Yu, 6600 Chatterton Road, Richmond, B.C., Canada, V7C 2Y7

[21] Appl. No.: 796,933

[22] Filed: Feb. 7, 1997

[51] Int. Cl.$^6$ .................................................. G08B 13/00
[52] U.S. Cl. .......................... 340/565; 340/541; 340/573; 340/692; 362/276
[58] Field of Search ................................. 340/565, 540, 340/541, 531, 573, 567, 692; 362/276

[56] References Cited

U.S. PATENT DOCUMENTS

| | | | |
|---|---|---|---|
| 4,275,274 | 6/1981 | English | 340/692 |
| 4,672,659 | 6/1987 | Hanscom et al. | 379/79 |
| 4,703,171 | 10/1987 | Kahl et al. | 250/221 |
| 4,731,815 | 3/1988 | Hanscom et al. | 379/70 |
| 4,800,533 | 1/1989 | Arakawa | 365/228 |
| 4,873,469 | 10/1989 | Young et al. | 315/155 |
| 4,912,457 | 3/1990 | Ladd | 340/573 |
| 4,949,077 | 8/1990 | Mbuthia | 340/628 |
| 4,959,852 | 9/1990 | Kern et al. | 379/70 |
| 4,988,980 | 1/1991 | Graham | 340/692 |
| 5,015,994 | 5/1991 | Hoberman et al. | 340/567 |
| 5,128,654 | 7/1992 | Griffin et al. | 340/567 |
| 5,153,566 | 10/1992 | Yun | 340/689 |
| 5,182,769 | 1/1993 | Yamaguchi et al. | 379/387 |
| 5,282,118 | 1/1994 | Lee | 362/276 |
| 5,386,210 | 1/1995 | Lee | 340/567 |
| 5,418,841 | 5/1995 | Haraguchi et al. | 379/70 |
| 5,442,532 | 8/1995 | Boulos et al. | 362/276 |
| 5,489,891 | 2/1996 | Diong et al. | 340/567 |
| 5,532,680 | 7/1996 | Ousborne | 340/567 |
| 5,646,594 | 7/1997 | Barben, Jr. et al. | 340/567 |

Primary Examiner—Thomas Mullen
Assistant Examiner—Nina Tong

[57] ABSTRACT

A lighting fixture with a motion detector is improved by incorporating an announcement device into the lighting fixture. The announcement device is a sound recording and playback device. When a person or an object enters into an area monitored by the motion detector, the motion will be detected by the motion detector. The motion detector will then turn on the lighting fixture and the announcement device to playback an announcement or a message through an amplifier and a speaker. The announcement can either be a prerecoreded announcement by manufacturer such as a warning to intruder, a welcome greeting to visitor or guest, a short tune of music etc. or a personalized announcement recorded by a user. In the first embodiment, the lighting fixture, motion detector and announcement device are assembled together within the lighting fixture body and formed integral parts of the lighting fixture. In the second embodiment, two or more lighting fixtures assembled together with motion detectors are connected to a single announcement device which is installed as a separate device to minimize the number of announcement devices required to serve the monitored area. In the third embodiment, a single motion detector is connected to two or more lighting fixtures and a single announcement device which is installed as a separate device to minimize the number of motion detectors and announcement devices required to serve the monitored area.

8 Claims, 3 Drawing Sheets

LIGHTING FIXTURE WITH MOTION DETECTOR AND ANNOUNCEMENT DEVICE

BACKGROUND OF THE INVENTION

This invention relates to lighting fixture with motion detector incorporating an announcement device.

Lighting fixtures for indoor and outdoor uses controlled by motion detectors with infrared sensors have been widely used nowadays. These lighting fixtures are activated in response to motion by a person or an object such as a motor vehicle entering into an area monitored by the motion detector.

After the infrared sensor of the motion detector detects the invisible infrared heat radiation emitted by the moving person or motor vehicle, an electronic signal is then transmitted by the motion detector which causes the lighting fixture to turn on. Such lighting fixtures are desirable in that they improve safety by automatically providing illumination for approaching person or motor vehicle. They also save energy by automatically mining off the lights after a period of time when the person or motor vehicle has left the monitored area.

In order to enhance the security aspect and to serve as an improved novel feature of the lighting fixture, an announcement device is incorporated into the lighting fixture. The announcement device can be used to warn outside intruder or to greet a guest or visitor entering into an area monitored by the motion detector.

BRIEF SUMMARY OF THE INVENTION

The present invention provides an electrical illumination and sound device comprising a lighting fixture with motion detector connected to an announcement device for indoor or outdoor uses.

When a person or an object such as a motor vehicle enters into an area and detected by the motion detector, an electronic signal is transmitted by the motion detector which causes the lighting fixture to turn on and at the same time causes the announcement device to playback an announcement or a message through an amplifier and a speaker. The announcement or message can be a warning to intruder, a greeting to welcome people or a tone of music etc.. The announcement is either prerecorded by manufacturer or a personalized message recorded by a user. After the announcement, the lighting fixture will remain in the 'on' condition for a period of time which is adjustable in the motion detector. The motion detector will then turn off unless it detects further movement of the person or object within the monitored area.

A further understanding and appreciation of the advantages of the invention will become apparent from a consideration of the drawings and ensuing description.

DETAILED DESCRIPTION OF THE INVENTION

Figure 1:
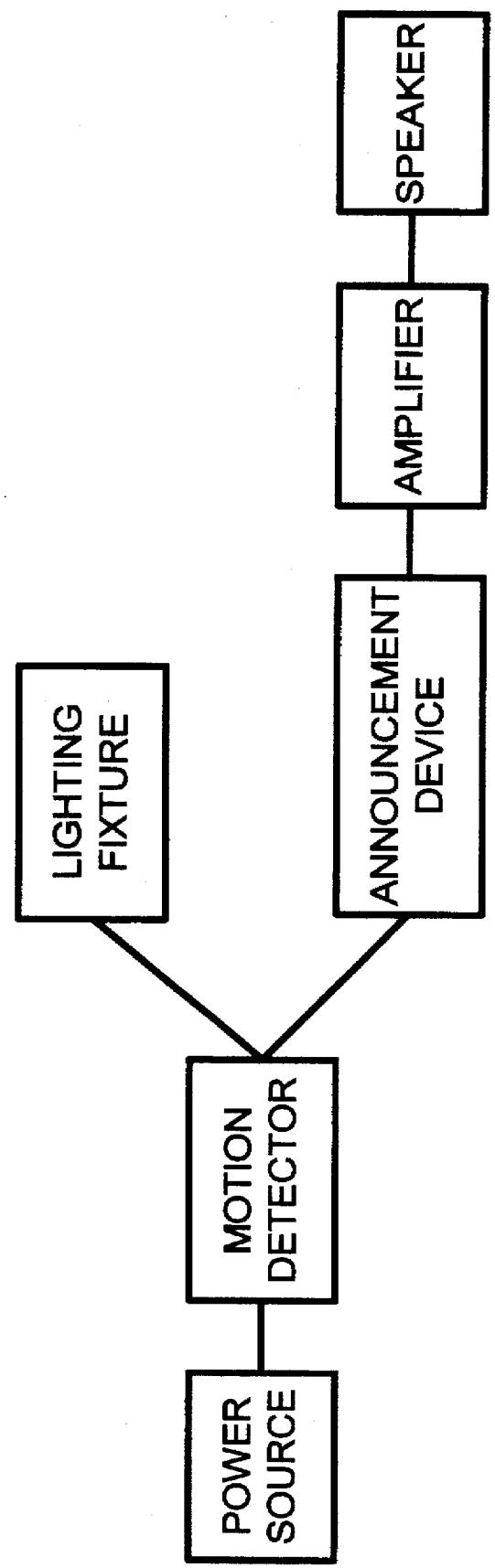
FIG. 1 is a block diagram of a lighting fixture with a motion detector connected to an announcement device. The announcement device is connected to an amplifier and a speaker.

The first embodiment FIG. 1 shows a lighting fixture with a motion detector connected to an announcement device. The lighting fixture comprising an illumination device such as a light bulb, a motion detector, and an announcement device are assembled together within the body of the lighting fixture and formed integral pans of the lighting fixture. The motion detector is connected to power supply source. The lighting fixture can either be an outdoor or an indoor lighting fixture. The motion detector may comprise of an ultrasonic or infrared sensor. These sensors use changes in received ultrasonic or infrared energy to indicate movement of a person or an object such as a motor vehicle within an area monitored by the motion detector. One drawback on the ultrasonic sensor is that it is subject to false triggering due to noise vibration unrelated to the monitored area. Hence, infrared sensor is more widely used for lighting fixture with motion sensor than ultrasonic sensor. The sensitivity of the infrared sensor can be adjusted to a level such that movements of small animals e.g. dog, cat etc. will not trigger the lighting fixture and announcement device.

When a person or an object such as a motor vehicle enters into an area monitored by the motion detector, the invisible infrared heat radiation emitted by the moving person or object is detected by the infrared sensor of the motion detector. The thermal radiation detected is converted into an electronic signal to turn on the illumination device of the lighting fixture and trigger the announcement device which will playback an announcement or a message. The announcement device is a sound recording and playback device similar to the one used in a telephone answering machine. Upon activation by the incoming signal from the motion detector, the announcement recorded on a magnetic tape or solid state chip is playbacked. During playback mode, the announcement device will transmit an audio signal to an amplifier which amplifies the audio signal. A speaker is connected to the amplifier which converts the audio signal into sound.

After the announcement by the announcement device, the lighting fixture will remain on following cessation of motion by the person or object for a delayed period of time which can be adjusted accordingly in the motion detector.

The announcement in the announcement device can be prerecorded messages by manufacturer such as a dog's barking to scare away stranger, a verbal warning to outside intruder, a short tune of music, a welcome greeting to visitor or guest etc. If a user requires a personalized announcement or message, he or she can record his or her own announcement in the announcement device. The length of the announcement depends on the available length of the magnetic tape or memory space of the solid state chip. The solid state chip used in the announcement device shall be a 'non-volatile chip such as EEPROM chip so that in the event of a power failure, all the information stored in the memory chip will not be lost.

Figure 2:
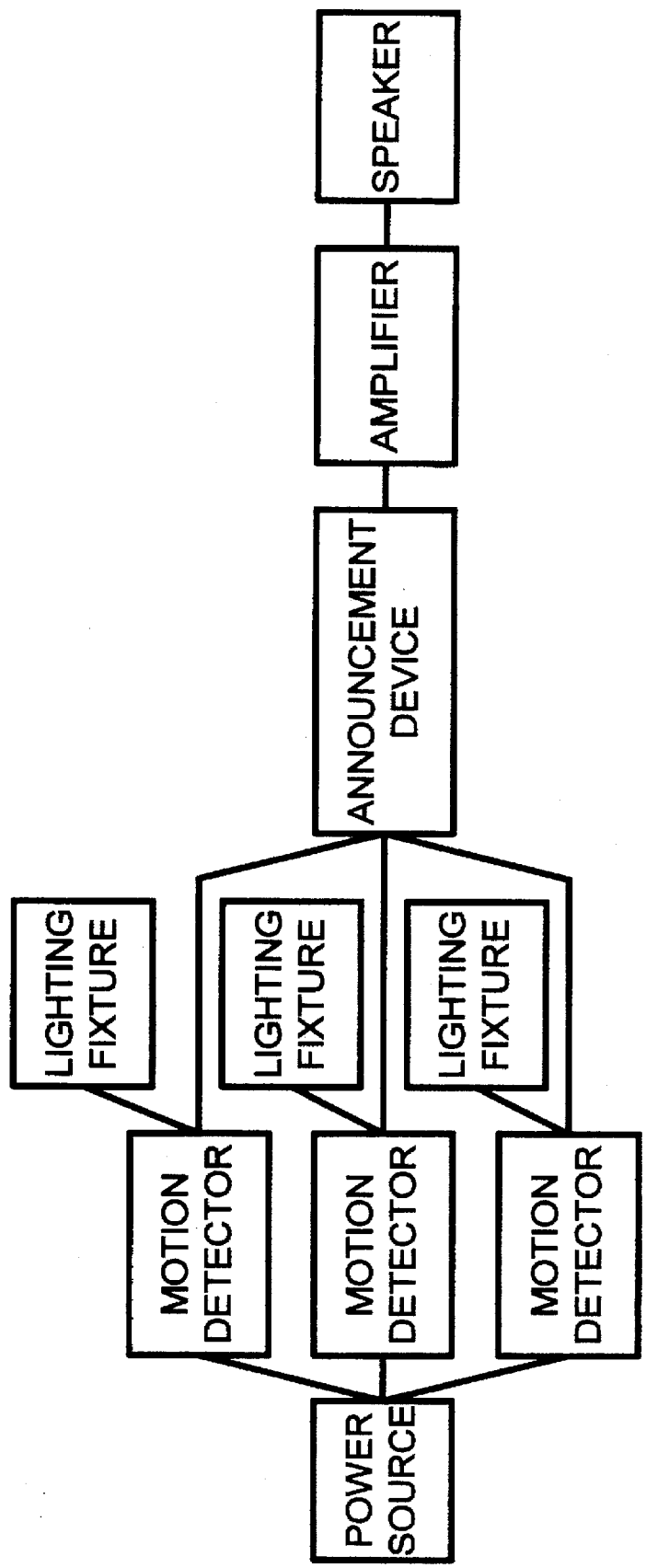
FIG. 2 is a block diagram of three lighting fixtures with motion detectors connected to a single announcement device. The announcement device is connected to an amplifier and a speaker.

The second embodiment illustrated in FIG. 2 shows that three lighting fixtures with motion detectors are connected to a single announcement device. The lighting fixture and motion detector are assembled within the lighting fixture body and formed integral parts of the lighting fixture connecting to the single announcement device which is installed as a separate device. This version is applicable where two or more lighting fixtures with motion detectors monitoring a particular area such as a house front yard or backyard, entrance foyer etc. can be grouped together and connected to the single announcement device to minimize the number of announcement devices required to serve the monitored area.

Figure 3:
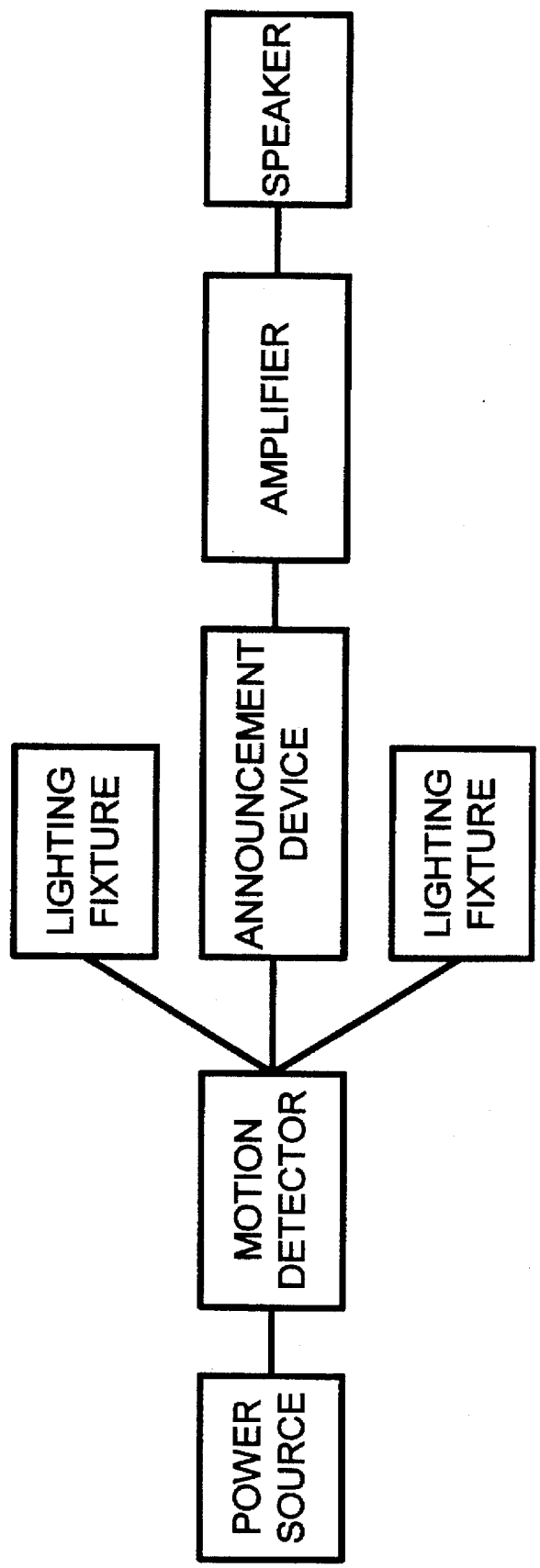
FIG. 3 is a block diagram of a single motion detector connected to two lighting fixtures and a single announcement device. The announcement device is connected to an amplifier and a speaker.

The third embodiment illustrated in FIG. 3 shows that a single motion detector is connected to two lighting fixtures and a single announcement device. This embodiment is applicable where the single motion detector which is installed as a separate device monitoring an area adequately covered by one motion detector, and the area requires two or more lighting fixtures for illumination such as a hallway. The arrangement will minimize the number of motion detectors and announcement devices required to serve the monitored area.

Thus, the announcement device will enhance the security aspect and add a new improved feature for the lighting fixture with motion detector.

While the above description contains many specificities, these should not be construed as limitations on the scope of the invention, but rather as an exemplification of the three preferred embodiments thereof. For example the announcement device with the amplifier can be assembled in a unit inside the house and connected to the motion detector and speaker installed outside the house. This version will facilitate the user in recording or changing his or her personalized announcement comfortably inside the house while monitoring any happening outside the house.

Although the foregoing invention has been described in some detail by way of drawing and example for the purposes of clarity of understanding, it will be readily, apparent to those of ordinary skill in the art in light of the teachings of this invention that certain changes and modifications may be made thereto without departing from the spirit or scope of the appended claims.

What I claim as my invention is:

1. An apparatus comprising:

at least one lighting fixture includes an illumination device;

at least one motion detector to detect motion by a person or an object in an area monitored by said at least one motion detector;

an announcement device; and means to turn on the said at least one lighting fixture and said announcement device to transmit a prerecorded announcement or message in response to motion detected by said at least one motion detector;

wherein said announcement device having means to record and playback said announcement or said message, and said announcement can either be a prerecorded announcement by manufacturer, such as a warning to intruder, a welcome greeting to visitor or guest, or a short tune of music, or a personalized announcement recorded by a user.

2. The apparatus of claim 1 wherein said motion detector is an infrared at least one motion detector.

3. The apparatus of claim 1 wherein said at least one motion detector is an ultrasonic motion detector.

4. The apparatus of claim 1 further including an amplifier which amplifies an audio signal transmitted from said announcement device.

5. The apparatus of claim 1 further including a speaker which converts an audio signal from an amplifier into sound.

6. The apparatus of claim 1 wherein said motion detector and said announcement device are assembled together within said lighting fixture body and disposed to form integral parts of said lighting fixture.

7. The apparatus of claim 1 wherein said motion detector is a separate device connected to said lighting fixture and does not form an integral part of said lighting fixture.

8. The apparatus of claim 1 wherein said announcement device is a separate device connected to said motion detector and does not form an integral part of said lighting fixture.

* * * * *